(No Model.)
A. G. WATERHOUSE.
REGULATOR FOR ELECTRIC MOTORS.
No. 387,194.  Patented July 31, 1888.
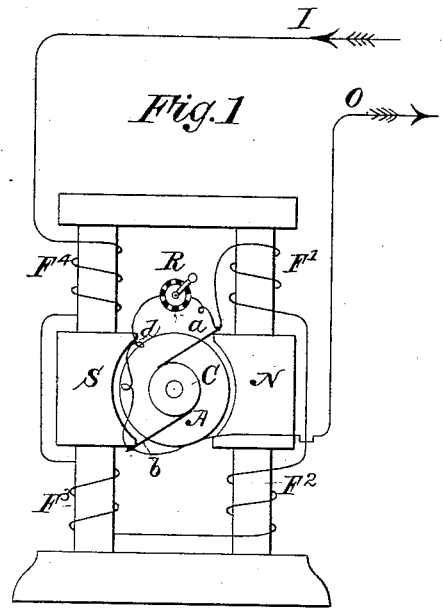
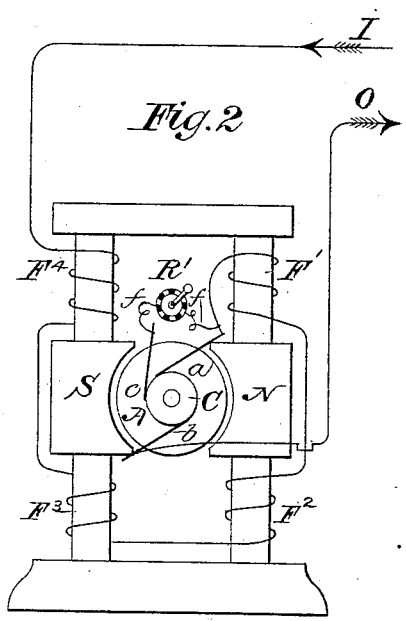
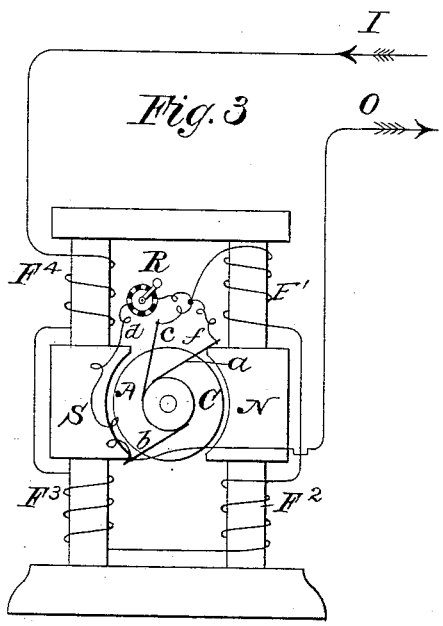
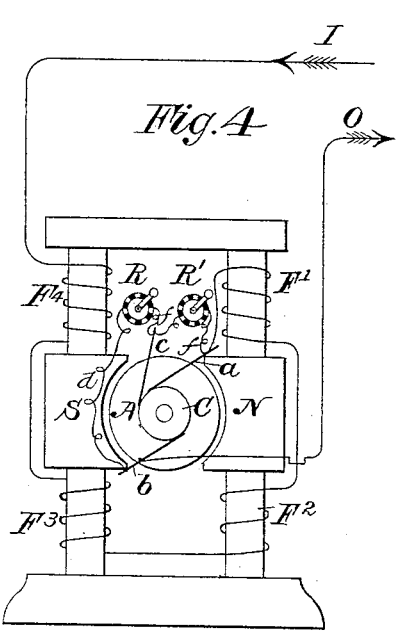
Witnesses
Chas. E. Chapin
M. E. Lewis
Inventor
Addison G. Waterhouse

United States Patent Office.

ADDISON G. WATERHOUSE, OF HARTFORD, CONNECTICUT, ASSIGNOR TO THE WATERHOUSE ELECTRIC AND MANUFACTURING COMPANY, OF SAME PLACE.

REGULATOR FOR ELECTRIC MOTORS.

SPECIFICATION forming part of Letters Patent No. 387,194, dated July 31, 1888.

Application filed May 25, 1887. Serial No. 239,363. (No model.)

*To all whom it may concern:*

Be it known that I, ADDISON G. WATERHOUSE, of the city of Hartford, State of Connecticut, have invented certain new and useful Improvements in Electric Motors, of which the following is a specification.

My invention relates to a method of regulating the speed of a motor so that any given speed will be maintained irrespective of load or the work that the motor may be required to perform, and independent of any changes in the strength of the current transmitted through the motor.

It is a well-known fact that electric motors generate an inverse current, which current flows in an opposite direction to that transmitted from the prime source, and that this current is proportional to the speed of the motor, acts in the nature of resistance to cut down the prime current, and limits the speed of the motor, thus impairing its efficiency.

The object of my invention is to utilize this counter-current to regulate the speed of the motor, and this I accomplish in the manner which I will now proceed to describe.

Referring to the diagrams, Figure 1 is a front elevation of a motor provided with two collecting-brushes and a resistance-coil interposed in a shunt-conductor connecting the two collecting-brushes. Fig. 2 is a similar view showing three collecting-brushes, two main and one auxiliary, and a resistance-coil in a shunt-conductor connecting one of the main brushes to the auxiliary brush. Fig. 3 is likewise a similar view showing three collecting-brushes, two of which are connected together by a conductor, and both to a third auxiliary brush by a conductor, in the circuit of which a resistance-coil is interposed. Fig. 4 is a similar view showing three brushes, pairs of which are connected together by conductors having resistance-coils interposed between the brushes.

In the drawings, similar letters of reference indicate like parts.

The current from the prime source of supply is transmitted to the motor by the conductor I, and is carried around to field-magnets $F'$, $F^2$, $F^3$, and $F^4$, and is connected to the brush $a$, resting upon the commutator C of the armature A, which may be either of the drum or ring type, and the coils thereon connected to the commutator in the well-known manner to form a closed circuit. The current traverses the coils of the armature to the brush $b$, and from thence back to the prime source of supply by the conductor O. The path of the main current in each of the four diagrams is the same.

Referring to Fig. 1, $d$ represents a conductor connected to the brush $a$ and to the resistance R, which, for convenience, may be made up of a number of coils, and can be either a fixed or an adjustable resistance, or any suitable device adapted to throw resistance into or out of the circuit, as required, and energized by a derived current from the main current, or by a mechanical device connected to the armature or the moving part of the machine. The conductor $d$ is likewise connected to the brush $b$, and thus provides a path or shunt for a portion of the current around the armature. The current from I, upon reaching the brush $a$, divides between the armature helices and the shunt-path, and the division will be in proportion to the resistance of the two paths, it being understood that the counter electro-motive force generated in the armature and depending upon the speed of rotation of the armature is considered in the nature of resistance.

It will be understood that as all the current traverses the helices of the field-magnets before it reaches the armature the field-magnets are at all times fully magnetized and irrespective of whether the current is passing through the armature or through the shunt-conductor and resistance R; and hence the magnetism of the fields is preserved constant.

In designing a machine, the resistance at R in the shunt-conductor is made high enough to cause a part of the current to flow through the armature, which will effect the rotation of the armature, and as speed of rotation increases a counter electro-motive force will be set up in the armature, which will oppose the passage of the current through it, and more of the current will in consequence flow around the resistance R.

It is found in practice that when the resistance of the armature and the shunt path or paths are properly proportioned any increase in the speed of the armature is practically balanced by the inverse electro-motive force set up, which will be slow as the resistance of the shunt is decreased and faster as it is increased, so that by varying the resistance at R different degrees of speed will be imparted to the armature.

In the diagram, Fig. 2, $c$ is an auxiliary brush resting upon the commutator and in advance of the brush $a$ and electrically connected to $a$ by a conductor, $f$, and the interposed resistance-coil R′, which in all respects may be similar to that described in connection with Fig. 1. The current on conductor I in this case divides at the brush $a$, and passes through the conductor $f$ and resistance to brush $c$. One portion of the current traverses the helices of the armature between brushes $a$ and $b$, and the other portion from brush $c$ to $b$.

By the rotation of the armature a local current is set up between the brushes $a$ and $c$ and including the armature-coils between them. This local current increases with the speed of the armature and serves to alter the position of the magnetic lines in the armature, thereby retarding its speed of rotation and practically limiting its speed to a determined velocity, which velocity may be increased or decreased by increasing or decreasing the resistance of R′.

The diagram, Fig. 3, shows the shunt-path $d$, combined with the path $f$ of Fig. 2, the resistance-coil R′ being omitted from the path $f$. The current on I in this case is divided between three paths—two being by way of the brushes $a$ and $c$, through the armature-helices to the brush $b$, and the third path being a shunt around the armature through the resistance R. In the form shown in Fig. 3 we have the local circuit of Fig. 2 and the shunt-circuit of Fig. 1. Variation of resistance of the shunt-path varies the current flowing through the armature and serves to effect a constant speed of rotation.

In the diagram, Fig. 4, the brushes $a$ and $c$ are connected together, as in Fig. 2, and the brushes $c$ and $b$, as in Fig. 1. In this form a very high resistance can be used between the brushes $a$ and $b$, thereby diverting most of the current through the armature. This gives to the motor all the power that is due to the current employed, and any desired speed may be obtained by adjusting the hand-resistance R′, which connects the brushes $a$ and $c$, so by increasing the resistance R′ a greater speed will be maintained in the armature, and by lowering the resistance of R a slower speed will be produced.

I have shown but one auxiliary brush, $c$, placed near the main brush $a$; but I may use two auxiliary brushes—one connected to $a$ and the other to $b$—the electrical connections being similar to those shown between the brushes $a$ and $c$.

I also desire to include in this invention the use of a high-resistance magnet in combination with a resistance-changing mechanism to be employed as follows: The said high-resistance magnet to be connected between brushes $a$ and $c$, and the changeable resistance to be placed between brushes, either $a$ and $b$ or $b$ and $c$, so as the speed increases it will act upon said magnet and cause it to change the resistance between brushes $a$ and $b$ or $b$ and $c$, and thereby reduce such increase of speed to its proper motion; or, again, the said high-resistance magnet can be placed between brushes $a$ and $b$ or $b$ and $c$, so as to work the resistance-changing mechanism, which can be placed between brushes $a$ and $c$.

I claim as my invention—

1. The herein-described method of regulating the speed of an electric motor provided with a closed circuited armature, which consists in diverting a portion of the current transmitted to the motor through a locally-closed circuit including one or more of the armature-helices, and containing an adjustable resistance, substantially as and for the purpose set forth.

2. The herein-described method of regulating the speed of an electric motor provided with a closed circuited armature, which consists in diverting a portion of the current transmitted to the motor through a locally-closed circuit including one or more of the armature-helices and through a shunt-circuit around the armature containing a fixed or an adjustable resistance.

3. The herein-described method of regulating the speed of an electric motor provided with a closed circuited armature, which consists in diverting a portion of the current transmitted to the motor through a locally-closed circuit including one or more of the armature-helices and containing a fixed or adjustable resistance and through a shunt-circuit around the armature also containing a fixed or adjustable resistance.

In witness whereof I have hereunto set my hand this 5th day of May, 1887.

ADDISON G. WATERHOUSE.

Witnesses:
  GEO. H. BENJAMIN,
  FREDRICK EBERHÉ.